Figure 1:
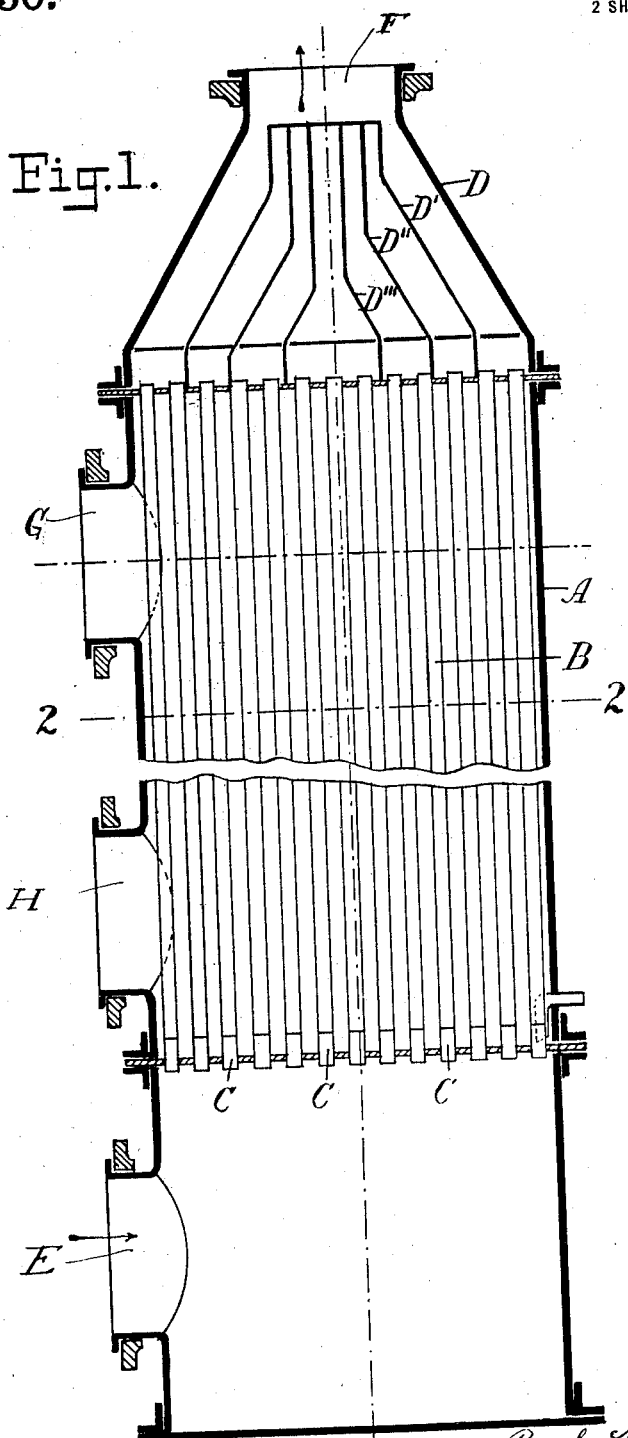

P. AUDIANNE.
HEAT EXCHANGE APPARATUS.
APPLICATION FILED JAN. 4, 1919.

1,358,050.

Patented Nov. 9, 1920.
2 SHEETS—SHEET 2.

INVENTOR:
Paul Audianne.
By Wm Wallace White
ATTY.

UNITED STATES PATENT OFFICE.

PAUL AUDIANNE, OF MARSEILLE, FRANCE.

HEAT-EXCHANGE APPARATUS.

1,358,050.

Specification of Letters Patent.

Patented Nov. 9, 1920.

Application filed January 4, 1919. Serial No. 269,583.

*To all whom it may concern:*

Be it known that I, PAUL AUDIANNE, a citizen of the Republic of France, residing at Marseille, France, have invented new and useful Improvements in Heat-Exchange Apparatus, of which the following is a specification.

This invention has for its object a heat interchanger of high thermal efficiency specially applicable for the manufacture of sulfur trioxid or sulfuric acid by the contact process.

The heat interchanger according to the present invention has a much greater efficiency than the interchangers hitherto employed and it allows the gases to be satisfactorily heated without employing fuel.

In the contact process for the manufacture of sulfuric acid it is necessary to warm the sulfurous gases before introducing them into the contact chambers and to cool the mixture leaving the contact chambers in order to be able to absorb the sulfur trioxid formed.

As the oxidation of sulfur dioxid in the contact chambers liberates much heat, the temperature of the gas is considerably higher at the exit than at the inlet of the contact chamber. It is thus theoretically possible to utilize the heat of the exit gas to heat up the inlet gas and thus to avoid the use of a source of external heat, at all events when once the plant has been started and is working regularly.

Heat interchangers allowing this exchange of heat between the inlet and exit gas are already used in various types of contact processes. In certain processes the heat interchanged is sufficient to avoid completely the necessity for using fuel, but in others, for instance in the Grillo-Schroeder, it has hitherto only been possible to reduce the quantity of fuel required and a certain amount of external heating was necessary to raise the gas after passing through the interchanger to the requisite temperature for admission to the contact chamber.

The total avoidance of auxiliary, *i. e.* of external heating is possible in the first mentioned process because of the special type of contact chambers which do not require a gas inlet temperature higher than 220° C. In other processes however, for instance in the Grillo-Schroeder process, the gas inlet temperature should reach about 300° C. Now the heat interchangers hitherto employed did not allow the attainment of a temperature higher than 220° C. On the other hand the hot gases leaving the contact chamber enter the heat interchanger at a temperature which does not exceed 425° C. in any process owing to the conditions of the phenomenon of catalysis in this case. Hence, if the heated gases are to leave the heat interchanger at above 300° C., the apparatus must allow of much more complete exchange of heat than the interchangers hitherto employed.

The interchanger constructed according to the present invention exhibits this increased efficiency.

The invention is illustrated by way of example in the accompanying drawings, in which:—

Figure 2:
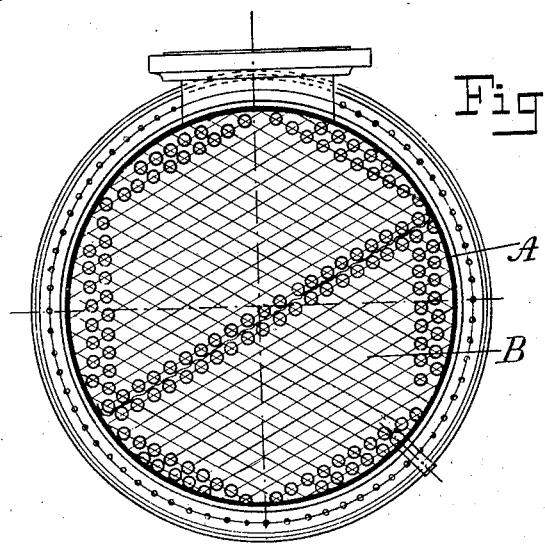
Figure 4:
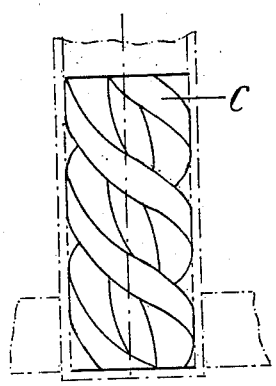
Figure 3:
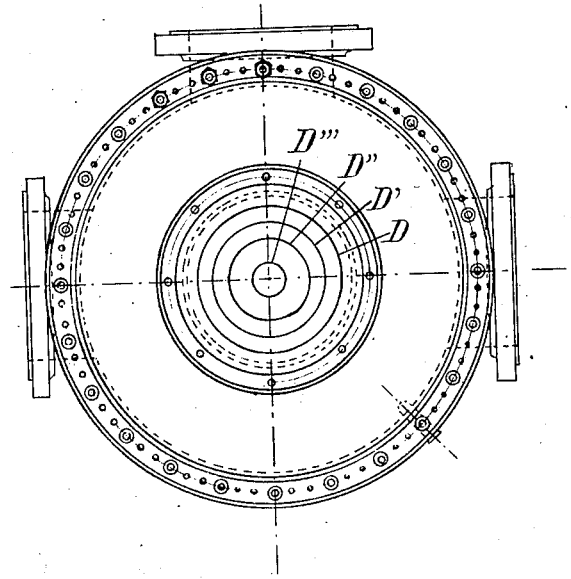

Figure 1 is a vertical section of the heat interchanger,

Fig. 2 a horizontal section on the line 2—2 of Fig. 1,

Fig. 3 a plan,

Fig. 4 a detail of a throttling device C in elevation and

Figure 5:
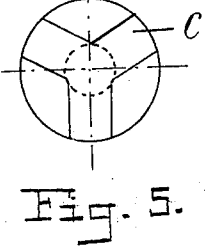

Fig. 5 is a plan view of the device shown in Fig. 4.

The heat interchanger is composed of a vertical steel cylinder A containing a set of tubes B.

The sulfur dioxid passes up through the interior of the tubes and through the cones D, D', D'', D''', and out through the outlet F at the top of the apparatus, from whence it passes to the apparatus (not shown) where it is changed to sulfur trioxid, the outlet 7 being adapted to be placed in communication with the inlet of said sulfur trioxid apparatus. The gas then enters the chamber formed by the upper part of the cylinder A through the upper inlet G on the side of the apparatus, which inlet is adapted to be placed in communication with the outlet from the sulfur trioxid apparatus. The gas is thus brought in contact with the exterior of the tubes B and passes through the chamber down around the tubes and out through the outlet H.

The tubes are arranged staggered and so close together that the total cross section available for passage of the gas is equal inside and around the tubes. The volume of the gas to be treated being known, the diameter of the cylinder is such that the linear velocity of the gas is sufficiently high, for instance, greater than three and a half meters per second.

The length of the tubes, their number and their diameter are so chosen that the total surface available for exchange of heat, i. e. the total surface of the sides of the tubes, is five square meters per ton of sulfur trioxid passing through the apparatus in twenty four hours if the gases are to be heated to 220° C. or twenty five square meters per ton per twenty four hours if the gases are to be heated to 325° C. Finally, to assure that the sulfurous gas is evenly distributed within the tubes, these are partially throttled at their lower end by devices C reducing the available cross sectional area of the inside of the tube. Thus these throttling devices C may for example consist of cast portions in the shape of a screw having three threads as shown in Fig. 4, or other similar arrangement may be made which imparts a rotary or gyratory movement to the gas.

To the same end the gases leaving the upper portion of the tubes pass through a truncated dome D, Fig. 1, provided in its interior with several concentric conical portions $D'$, $D^2$, $D^3$, spaced apart in such manner that gas will pass between the respective cones at substantially the same rate in each. The function of the conical portions D, $D'$, $D''$ and $D'''$ is to assure an equal distribution of the gas through all of the tubes B, and, therefore, a more perfect utilization of the heat exchange surface. Without these conical portions, the gas would have a tendency to pass only through the tubes at the center of the cylinder rather than those at the periphery, but by the provision of the conical portions a uniform distribution of the gas through the tubes is obtained.

The following example shows the main characteristics of two interchangers suitable for a production of ten tons of sulfur trioxid per twenty four hours:—

| | A. | B. |
|---|---|---|
| Diameter of cylinder | 0.8 meters | 0.8 meters. |
| Heat transferring surfaces of tubes | 50 sq. meters | 250 sq. meters. |
| Temperature of sulfur dioxid at inlet t/i | 40° C | 40° C. |
| Temperature of sulfur dioxid at exit t/o | 220° C | 320° C. |
| Temperature of sulfur trioxid at inlet T/o | 420° C | 420° C. |
| Temperature of sulfur trioxid at exit T/i | 240° C | 330° C. |
| Thermal efficiency equal $\frac{To-Ti}{To-ti}$ | 47% | 76%. |

The apparatus A, in spite of its small dimensions, is suitable for contact plant in which the temperature at the inlet to the contact chamber should not be above 210° C. Plant of the type B is much more efficient and when applied to Grillo-Schroeder process enables the use of fuel to be completely avoided for heating the gas when once normal conditions have been established. In either case a bypass provided with a suitable valve allows part of the cold gas to be diverted direct to the contact chamber without traversing the heat interchanger so as to control the temperature at the inlet to the contact chamber.

Having now particularly described and ascertained the nature of my said invention and in what manner the same is to be performed I declare that what I claim is:—

A heat interchanger, comprising a cylindrical member divided into a plurality of compartments, a plurality of tubes interconnecting certain of said compartments, said cylindrical member being provided with an inlet at its lower end and an outlet at its upper end respectively communicating with said interconnecting compartments, and said cylinder being also provided intermediate its ends with an inlet and an outlet communicating with a compartment that is out of communication with said interconnected compartments, and a plurality of hollow cone-shaped members in the upper part of said cylinder in communication at one end with said tubes and at the other end with a common outlet.

In testimony whereof I have signed my name to this specification.

PAUL AUDIANNE.

Witnesses:
EUGÈNE DUCASSON,
JOHN TRACEY.